US009043878B2

(12) United States Patent
Terris et al.

(10) Patent No.: US 9,043,878 B2
(45) Date of Patent: May 26, 2015

(54) METHOD AND SYSTEM FOR MULTI-TIERED DISTRIBUTED SECURITY AUTHENTICATION AND FILTERING

(75) Inventors: Benjamin S. Terris, Tucson, AZ (US); Richard A. Welp, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 81 days.

(21) Appl. No.: 13/413,563

(22) Filed: Mar. 6, 2012

(65) Prior Publication Data
US 2013/0239176 A1    Sep. 12, 2013

(51) Int. Cl.
*G06F 21/00* (2013.01)
*H04L 29/06* (2006.01)

(52) U.S. Cl.
CPC .............. *G06F 21/00* (2013.01); *H04L 63/08* (2013.01)

(58) Field of Classification Search
CPC ........... G06F 21/31; G06F 21/00; H04L 9/88; H04L 29/0685; H04L 63/08; H04L 63/10; H04L 63/102; H04L 63/105
See application file for complete search history.

(56) References Cited

U.S. PATENT DOCUMENTS

| | | | | |
|---|---|---|---|---|
| 5,715,487 A * | 2/1998 | McIntyre et al. | ............. | 396/299 |
| 5,758,150 A * | 5/1998 | Bell et al. | ................. | 1/1 |
| 5,872,588 A * | 2/1999 | Aras et al. | ........................ | 725/14 |
| 6,023,765 A | 2/2000 | Kuhn | | |
| 6,052,785 A * | 4/2000 | Lin et al. | ........................... | 726/5 |
| 6,173,406 B1 * | 1/2001 | Wang et al. | ........................ | 726/3 |
| 6,298,383 B1 * | 10/2001 | Gutman et al. | ................. | 709/229 |
| 6,337,899 B1 * | 1/2002 | Alcendor et al. | ............. | 709/229 |
| 6,986,038 B1 * | 1/2006 | Leah et al. | ..................... | 713/155 |
| 7,249,176 B1 * | 7/2007 | Salas et al. | ..................... | 709/225 |
| 7,505,756 B2 * | 3/2009 | Bahl | .............................. | 455/410 |
| 7,921,457 B2 * | 4/2011 | Skemer | ........................... | 726/12 |
| 8,051,491 B1 * | 11/2011 | Cavage et al. | .................. | 726/30 |
| 8,099,334 B1 * | 1/2012 | Stockwell | .................... | 705/26.1 |
| 8,271,321 B1 * | 9/2012 | Kestenbaum | ................ | 705/14.1 |
| 8,429,757 B1 * | 4/2013 | Cavage et al. | .................. | 726/30 |
| 2002/0002688 A1 * | 1/2002 | Gregg et al. | ................... | 713/202 |
| 2002/0118112 A1 * | 8/2002 | Lang | .......................... | 340/573.1 |
| 2002/0199123 A1 | 12/2002 | McIntyre et al. | | |
| 2003/0037237 A1 * | 2/2003 | Abgrall et al. | ................. | 713/166 |
| 2003/0126592 A1 * | 7/2003 | Mishra et al. | ................. | 717/176 |
| 2003/0229582 A1 | 12/2003 | Sherman et al. | | |
| 2004/0039924 A1 * | 2/2004 | Baldwin et al. | ............... | 713/189 |
| 2004/0128210 A1 * | 7/2004 | Gabos et al. | ..................... | 705/26 |
| 2004/0168090 A1 * | 8/2004 | Chawla et al. | ................ | 713/201 |
| 2004/0172558 A1 * | 9/2004 | Callahan et al. | ............. | 713/201 |
| 2005/0015591 A1 * | 1/2005 | Thrash et al. | ................. | 713/166 |

(Continued)

*Primary Examiner* — Andrew Nalven
*Assistant Examiner* — Walter Malinowski
(74) *Attorney, Agent, or Firm* — Sherman IP LLP; Kenneth L. Sherman; Hemavathy Perumal (57) ABSTRACT

Multi-tiered distributed security authentication and filtering. One embodiment comprises managing user access to one or more computing resources, by centrally maintaining user subscription information comprising user authentication information and system authorization information, and providing relevant subscription information from the user subscription information to one or more remote computing systems. Managing user access further includes, in a remote computing system, authenticating a user login to the remote computing system based on user authentication information from said relevant subscription information, and upon user authentication, selectively authorizing user access to computing resources of the remote computing system based on system authorization information from said relevant subscription information.

18 Claims, 5 Drawing Sheets

50

| Full User | User Name | User Password | Auth Level | System Type | Expiration |
|---|---|---|---|---|---|
| John Doe | jdoe | 1eMyPassw0rd | Service | 3957V06,3957V07 | 12-01-2011 |
| Sean Schnell | sspeters | battl3starWars | Enhanced | 2851SM1 | 11-11-2011 |

(56) References Cited

U.S. PATENT DOCUMENTS

| | | | |
|---|---|---|---|
| 2005/0021781 A1* | 1/2005 | Sunder et al. | 709/229 |
| 2005/0075911 A1* | 4/2005 | Craven, Jr. | 705/4 |
| 2005/0227773 A1* | 10/2005 | Lu et al. | 472/60 |
| 2006/0080553 A1* | 4/2006 | Hall | 713/189 |
| 2006/0106917 A1* | 5/2006 | Lambourn et al. | 709/217 |
| 2006/0112423 A1* | 5/2006 | Villadiego et al. | 726/9 |
| 2006/0206719 A1 | 9/2006 | Serani et al. | |
| 2006/0235796 A1* | 10/2006 | Johnson et al. | 705/44 |
| 2006/0253894 A1 | 11/2006 | Bookman et al. | |
| 2007/0077921 A1* | 4/2007 | Hayashi et al. | 455/414.1 |
| 2007/0192588 A1* | 8/2007 | Roskind et al. | 713/155 |
| 2007/0242824 A1* | 10/2007 | Vishik | 380/200 |
| 2008/0040491 A1* | 2/2008 | Minodier et al. | 709/229 |
| 2008/0065609 A1* | 3/2008 | Jenkins et al. | 707/3 |
| 2008/0126476 A1* | 5/2008 | Nicholas et al. | 709/203 |
| 2008/0235768 A1* | 9/2008 | Walter et al. | 726/3 |
| 2008/0271109 A1* | 10/2008 | Singh et al. | 726/1 |
| 2008/0320578 A1* | 12/2008 | Knapp | 726/10 |
| 2009/0150981 A1* | 6/2009 | Amies et al. | 726/5 |
| 2010/0241868 A1* | 9/2010 | Nachef et al. | 713/186 |
| 2010/0299716 A1* | 11/2010 | Rouskov et al. | 726/1 |
| 2010/0306547 A1* | 12/2010 | Fallows et al. | 713/178 |
| 2010/0306858 A1 | 12/2010 | McLaren et al. | |
| 2010/0318803 A1* | 12/2010 | Russell et al. | 713/175 |
| 2011/0055593 A1* | 3/2011 | Lurey et al. | 713/193 |
| 2011/0055913 A1 | 3/2011 | Wong | |
| 2011/0125363 A1* | 5/2011 | Blumer et al. | 701/33 |
| 2011/0247059 A1* | 10/2011 | Anderson et al. | 726/6 |
| 2011/0277019 A1* | 11/2011 | Pritchard, Jr. | 726/4 |
| 2011/0295988 A1* | 12/2011 | Le Jouan | 709/223 |
| 2011/0296164 A1* | 12/2011 | Boebert et al. | 713/150 |
| 2012/0011141 A1* | 1/2012 | Park et al. | 707/769 |
| 2012/0079574 A1* | 3/2012 | Koh et al. | 726/6 |
| 2012/0109882 A1* | 5/2012 | Bouse et al. | 707/607 |
| 2012/0122423 A1* | 5/2012 | Helmreich | 455/411 |
| 2012/0209735 A1* | 8/2012 | Subramanian et al. | 726/3 |
| 2013/0024915 A1* | 1/2013 | Jones et al. | 726/5 |
| 2013/0073975 A1* | 3/2013 | Bladel et al. | 715/739 |

* cited by examiner

| Full User | User Name | User Password | Auth Level | System Type | Expiration |
|---|---|---|---|---|---|
| John Doe | jdoe | 1eMyPassw0rd | Service | 3957V06,3957V07 | 12-01-2011 |
| Sean Schnell | sspeters | batt13starWars | Enhanced | 2851SM1 | 11-11-2011 |

FIG. 4

METHOD AND SYSTEM FOR MULTI-TIERED DISTRIBUTED SECURITY AUTHENTICATION AND FILTERING

FIELD OF THE INVENTION

The present invention relates generally to authentication in distributed systems, and more particularly to multi-tiered distributed security authentication.

DESCRIPTION OF RELATED ART

Distributed computing systems are utilized by many entities, and typically include many computing systems deployed in the field. Typically, several users are allowed access to one or more such computing systems, for purposes such as servicing the system or using them in accomplishing tasks. Each user may employ login information for logging into a computing system.

BRIEF SUMMARY

Embodiments of the present invention provide a system, method and computer program products for multi-tiered distributed security authentication and filtering. One embodiment comprises managing user access to one or more computing resources, by centrally maintaining user subscription information comprising user authentication information and system authorization information, and providing relevant subscription information from the user subscription information to one or more remote computing systems. Managing user access further includes, in a remote computing system, authenticating a user login to the remote computing system based on user authentication information from said relevant subscription information, and upon user authentication, selectively authorizing user access to computing resources of the remote computing system based on system authorization information from said relevant subscription information.

In one embodiment, said relevant subscription information for a remote computing system comprises subscription information for users that are associated with the computing resources of that remote computing system. The user authentication information comprises multilevel authentication and password information for filtering access to a remote computing system by one or more users. The system authorization information comprises filtering information for limiting access to certain computing resources for each user.

In one embodiment, authenticating a user login to the remote computing system comprises checking user provided credentials against the multilevel authentication and password information, for authenticating access to the remote computing system. Selectively authorizing user access to computing resources of the remote computing system comprises, upon user authentication, limiting access to certain computing resources for the user based on the system authorization information for that user.

In one embodiment, a subscription determines which computing resources a user is allowed to access remotely. Centrally maintaining user subscription information comprises maintaining the user subscription information in a central computing system in relation to the remote computing systems within a distributed computing system.

These and other aspects, features and advantages of the invention will be understood with reference to the drawing figures, and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention.

One or more exemplary embodiments of the invention are described below in detail. The disclosed embodiments are intended to be illustrative only since numerous modifications and variations therein will be apparent to those of ordinary skill in the art.

The present invention relates to multi-tiered distributed security authentication and filtering in information technology systems comprising multiple computing systems.

One embodiment comprises managing user access to one or more computing resources, by centrally maintaining user subscription information comprising user authentication information and system authorization information, and providing relevant subscription information from the user subscription information to one or more remote computing systems. In a remote computing system, authenticating a user login to the remote computing system based on user authentication information from said relevant subscription information, and upon user authentication, selectively authorizing user access to computing resources of the remote computing system based on system authorization information from said relevant subscription information.

In one embodiment, a subscription determines which computing resources a user is allowed to access remotely. In one embodiment, said relevant subscription information for a remote computing system comprises subscription information for users that are associated with the computing resources of that remote computing system.

In one embodiment, said user authentication information comprises multilevel authentication and password information for filtering access to a remote computing system by one or more users. Said system authorization information comprises filtering information for limiting access to certain computing resources for each user.

In one embodiment, authenticating a user login to the remote computing system comprises checking user provided credentials against the multilevel authentication and password information, for authenticating access to the remote computing system. In one embodiment, selectively authorizing user access to computing resources of the remote computing system comprises, upon user authentication, limiting access to certain computing resources for the user based on the system authorization information for that user. Further, centrally maintaining user subscription information comprises maintaining the user subscription information in a central computing system in relation to the remote computing systems within a distributed computing system.

Figure 1:
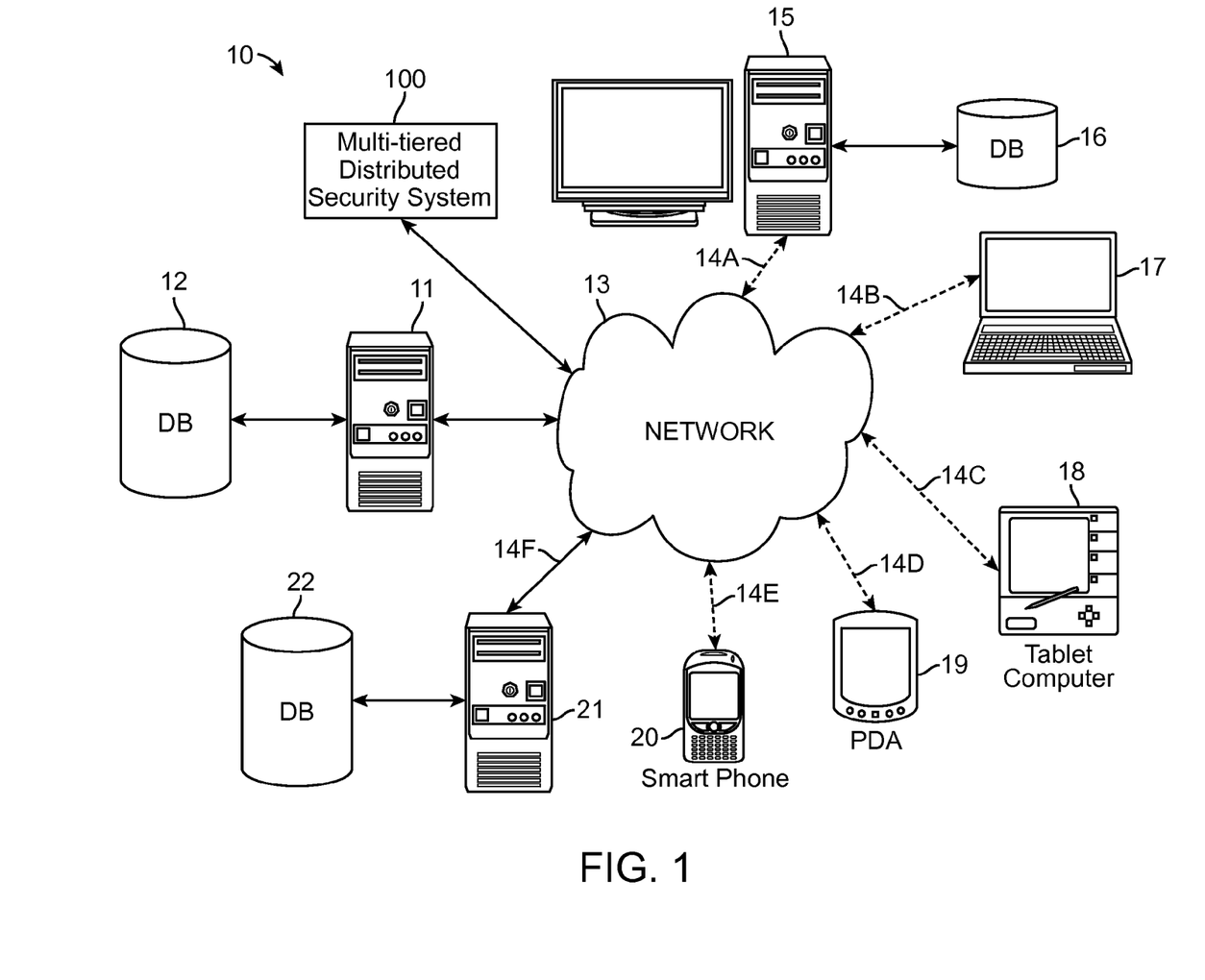
FIG. 1 is a block diagram illustrating an example of an information technology architecture for multi-tiered distributed security authentication and filtering, according to an embodiment of the present invention.

Referring now to the drawings, in which like numerals illustrate like elements throughout the several views, FIG. 1 illustrates an example of the basic components of an information technology system 10 utilizing multi-tiered distributed security authentication and filtering system comprising a distributed security system 100, in connection with a preferred embodiment of the present invention. The system 10 includes a server 11 and the remote devices 15 and 17-21 that utilize the distributed security system 100 of the present invention. Embodiments of the distributed security system 100 provide the ability to accurately and consistently control access to a plurality of remote computing systems (e.g., remote devices 15 and 17-21) deployed in the field.

Embodiments of the distributed security system 100 provide propagation of service user credentials from a centralized system (e.g., server 11) to remote computing systems deployed in the field, fine grained control over access to remote computing resources, and limiting service actions based on personal credentials of individual users.

Each of the remote devices 15 and 17-21 has applications and can have a local database 16, 22. Server 11 contains applications, and a database 12, and is connected to the network 13. Remote devices 15 and 17-21 connect to network 13 via connections 14(A-F). The distributed security system 100 executes software for controlling access to system resources, according to embodiments of the invention. The network 13 may comprise, but is not limited to: the Internet, a local area network (LAN), a wide area network (WAN), via a telephone line using a modem (POTS), Bluetooth, WiFi, WiMAX, cellular, optical, satellite, RF, Ethernet, magnetic induction, coax, RS-485, the like or other like networks.

The remote device 15 and 17-21 may each be located at remote sites. Remote device 15 and 17-21 include but are not limited to, PCs, workstations, laptops, handheld computers, pocket PCs, PDAs, pagers, WAP devices, non-WAP devices, cell phones, palm devices, printing devices and the like. Included with each remote device 15 and 17-21 is an ability to have attached resources (e.g., hardware, software).

Figure 2A:
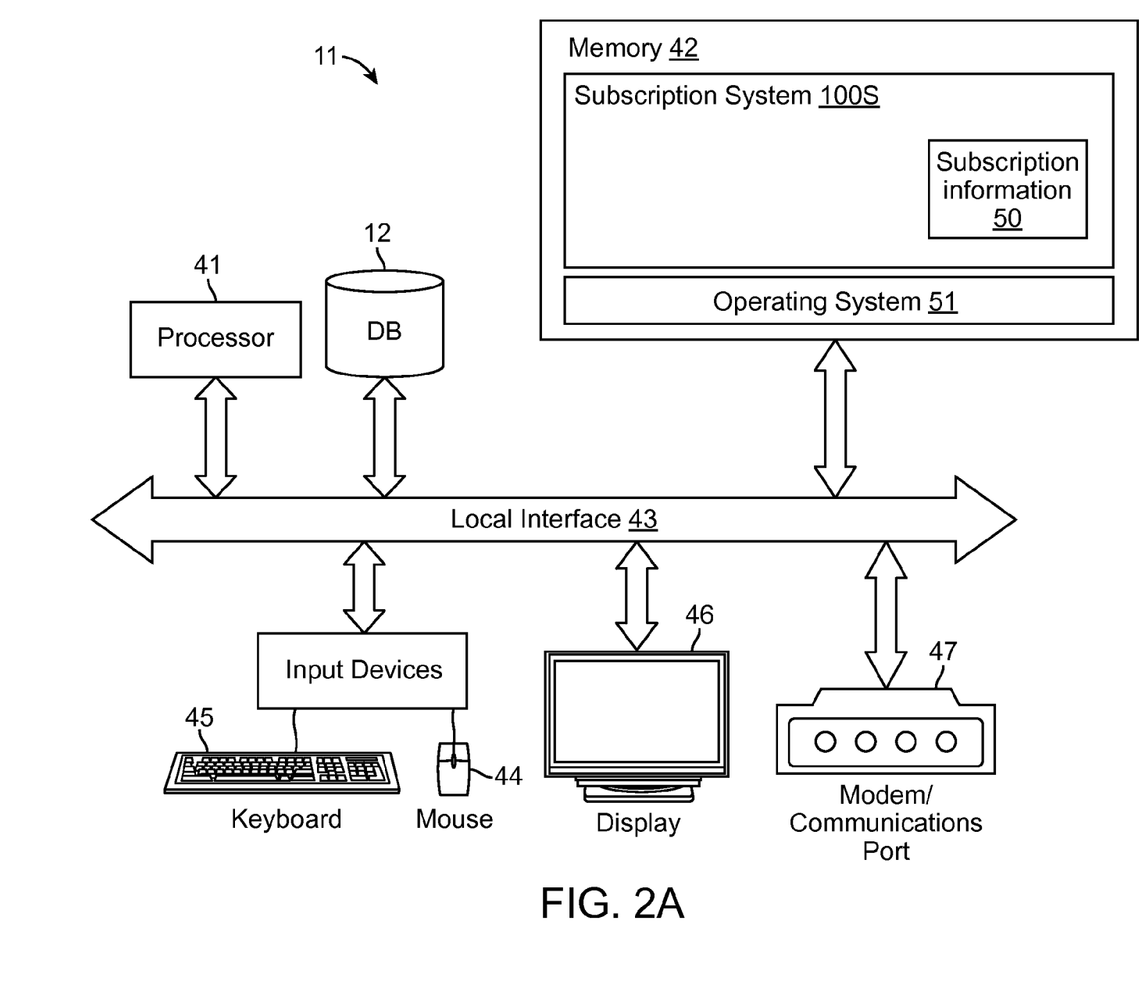
FIG. 2A is a block diagram illustrating an example of a centralized system utilizing a process for multi-tiered distributed security authentication and filtering, according to an embodiment of the present invention, as shown in FIG. 1.
Figure 2B:
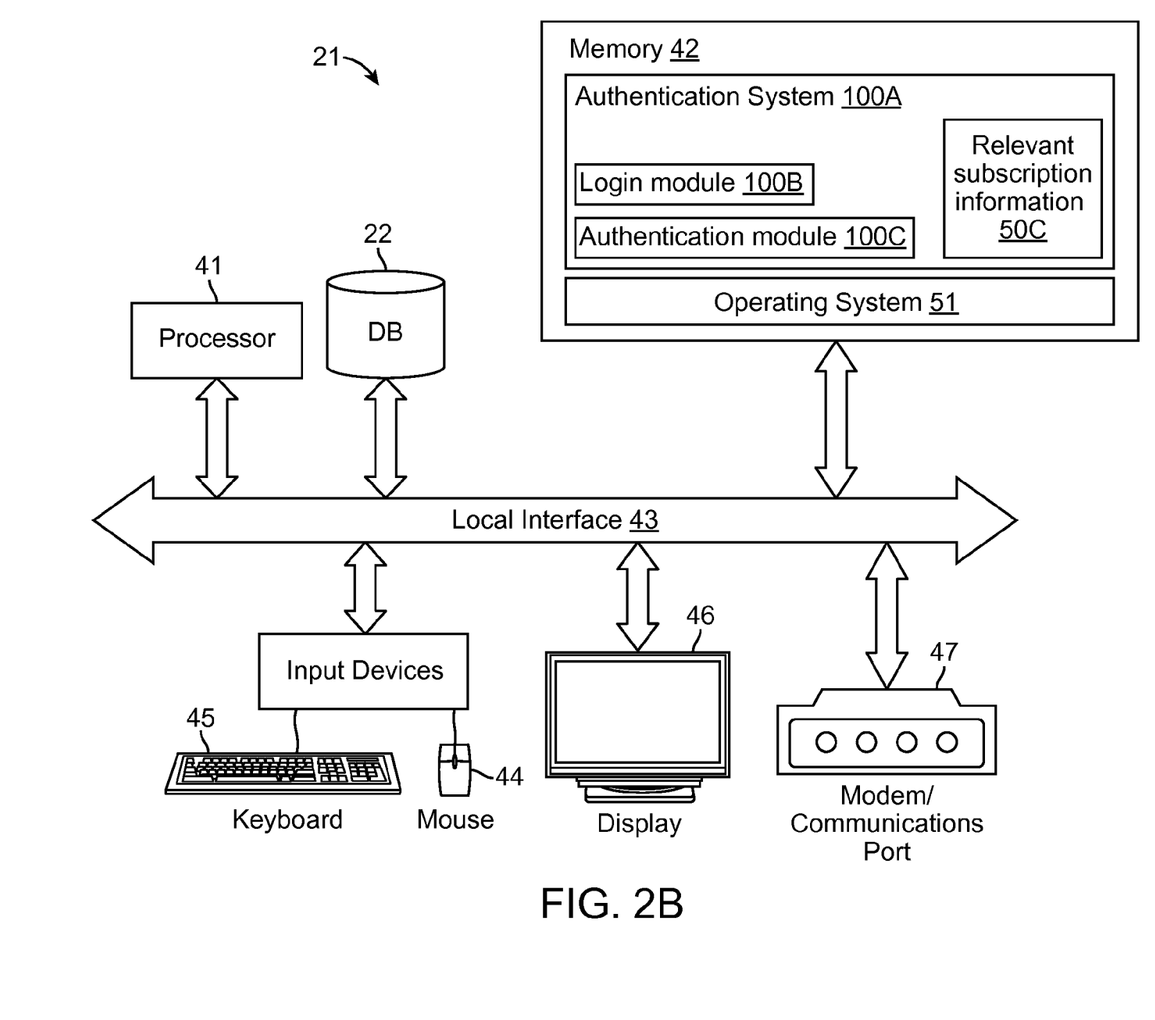
FIG. 2B is a block diagram illustrating an example of a remote system utilizing a process for multi-tiered distributed security authentication and filtering, according to an embodiment of the present invention, as shown in FIG. 1.

In one embodiment of the invention, the distributed security system 100 comprises a subscription system 100S implemented by the server 11 (FIG. 2A) and at least one authentication system 100A implemented on the remote system 21 (FIG. 2B). In one embodiment, each of the remote devices 15, 17-20 may also include an authentication system 100A.

Specifically, illustrated in FIG. 2A is a block diagram demonstrating an example of the server 11, as shown in FIG. 1, implementing a subscription system 100S according to an embodiment of the present invention. Server 11 includes, but is not limited to, PCs, workstations, laptops, PDAs, palm devices and the like.

Generally, in terms of hardware architecture, as shown in FIG. 2A, the server 11 includes a processor 41, a computer readable medium such as memory 42, and one or more input and/or output (I/O) devices (or peripherals) that are communicatively coupled via a local interface 43. The local interface 43 can be, for example but not limited to, one or more buses or other wired or wireless connections, as is known in the art. The local interface 43 may have additional elements, which are omitted for simplicity, such as controllers, buffers (caches), drivers, repeaters, and receivers, to enable communications. Further, the local interface 43 may include address, control, and/or data connections to enable appropriate communications among the aforementioned components.

The processor 41 is a hardware device for executing software that can be stored in memory 42. The processor 41 can be virtually any custom made or commercially available processor, a central processing unit (CPU), data signal processor (DSP) or an auxiliary processor among several processors associated with the server 11, and a semiconductor based microprocessor (in the form of a microchip) or a microprocessor. An example of a suitable commercially available microprocessor is a PowerPC microprocessor from IBM, U.S.A.

The memory 42 can include any one or combination of volatile memory elements (e.g., random access memory (RAM), such as dynamic random access memory (DRAM), static random access memory (SRAM), etc.) and nonvolatile memory elements (e.g., read only memory (ROM), erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 42 may incorporate electronic, magnetic, optical, and/or other types of storage media. Note that the memory 42 can have a distributed architecture, where various components are situated remote from one another, but can be accessed by the processor 41.

The software in memory 42 may include one or more separate programs, each of which comprises an ordered listing of executable instructions for implementing logical functions. In the example illustrated in FIG. 2A, the software in the memory 42 includes a suitable operating system (O/S) 51 and the subscription system 100S of the present invention. The subscription system 100S comprises functional components and process blocks described further below.

The operating system 51 essentially controls the execution of other computer programs, such as the system 100, and provides scheduling, input/output control, file and data management, memory management, and communication control and related services. However, the subscription system 100S of the present invention is applicable on all other commercially available operating systems.

The subscription system 100S may comprise a source program, executable program (object code), script, or any other entity comprising a set of computer program instructions to be performed. When the subscription system 100S is a source program, then the program is usually translated via a compiler, assembler, interpreter, or the like, which may or may not be included within the memory 42, so as to operate properly in connection with the O/S 51. Furthermore, the subscription system 100S can be written as (a) an object oriented programming language, which has classes of data and methods, or (b) a procedure programming language, which has routines, subroutines, and/or functions. The computer program instructions may execute entirely on server 11, partly on the server 11, as a stand-alone software package, partly on server 11 and partly on a remote computer or entirely on the remote computer or server. In the latter scenario, the remote computer may be connected through any type of network, including a local area network (LAN) or a wide area network (WAN), or the connection may be made to an external computer (for example, through the Internet using an Internet Service Provider).

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The I/O devices may include input devices, for example but not limited to, a mouse 44, keyboard 45, scanner (not shown), microphone (not shown), etc. Furthermore, the I/O devices may also include output devices, for example but not limited to, a printer (not shown), display 46, etc. Finally, the I/O devices may further include devices that communicate both inputs and outputs, for instance but not limited to, a NIC or modulator/demodulator 47 (for accessing remote devices, other files, devices, systems, or a network), a radio frequency (RF) or other transceiver (not shown), a telephonic interface (not shown), a bridge (not shown), a router (not shown), etc.

If the server 11 is a PC, workstation, intelligent device or the like, the software in the memory 42 may further include a basic input output system (BIOS) (omitted for simplicity). The BIOS is a set of essential software routines that initialize and test hardware at startup, start the O/S 51, and support the transfer of data among the hardware devices. The BIOS is stored in some type of read-only-memory, such as ROM, PROM, EPROM, EEPROM or the like, so that the BIOS can be executed when the server 11 is activated.

When the server 11 is in operation, the processor 41 is configured to execute software stored within the memory 42, to communicate data to and from the memory 42, and generally to control operations of the server 11 pursuant to the software. The subscription system 100S and the O/S 51 are read, in whole or in part, by the processor 41, perhaps buffered within the processor 41, and then executed.

When subscription system 100S is implemented in software, as is shown in FIG. 2A, it should be noted that the subscription system 100S can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, propagation medium, or other physical device or means that can contain or store a computer program for use by or in connection with a computer related system or method.

More specific examples (a non-exhaustive list) of the computer-readable medium would include the following: an electrical connection (electronic) having one or more wires, a portable computer diskette (magnetic or optical), a random access memory (RAM) (electronic), a read-only memory (ROM) (electronic), an erasable programmable read-only memory (EPROM, EEPROM, or Flash memory) (electronic), an optical fiber (optical), and a portable compact disc memory (CDROM, CD R/W) (optical). Note that the computer-readable medium could even be paper or another suitable medium, upon which the program is printed or punched (as in paper tape, punched cards, etc.), as the program can be electronically captured, via for instance optical scanning of the paper or other medium, then compiled, interpreted or otherwise processed in a suitable manner if necessary, and then stored in a computer memory.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

In an alternative embodiment, where the subscription system 100S is implemented in hardware, the subscription system 100S can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As noted, the distributed security system 100 further includes one or more authentication systems 100A, as showing in FIG. 2B. Specifically, illustrated in FIG. 2B is a block diagram demonstrating an example of the remote computing system 21, as shown in FIG. 1, implementing an authentication system 100A, according to an embodiment of the present invention. The remote system 21 includes, but is not limited to, PCs, workstations, laptops, PDAs, palm devices and the like. In one embodiment, the remote system 21 is architecturally similar to the server 11 described above, except that the remote system 21 implements an authentication system 100A instead of a subscription system 100S, according to embodiments of the invention.

Further, one or more of the other remote systems 15, 17-20 may also have similar architecture as the remote system 21 and implement a subscription system 100S, according to embodiment of the invention. As illustrated, the remote device 15 and 17-21 are similar to the description of the components for remote device 21 described with regard to FIG. 2A. Hereinafter, the remote devices 15 and 17-21 will be referred to as remote devices 21 for the sake of brevity.

The distributed security system 100 provides multi-tiered distributed security authentication and filtering wherein a centralized system such as the server 11 stores the subscription information of users of multiple remote computing systems such as devices 21, such that the users have authorized access to such remote computing systems. A subscription determines which system or systems types a user is allowed to access remotely. The centralized system propagates updates to the remote computing systems, such as remote service consoles (TSSCs). Each remote computing system maintains a local version of relevant portions of said subscription information, allowing each remote computing system to control local and remote access to that remote computing system and its attached modules/systems.

In embodiment of the distributed security system 100, subscription data is maintained by the server 11 in storage such as database 12, and used to authenticate user access to one or more of the remote devices 21. When a user desires to access one of the remote devices 21, the distributed security system 100 provides multi-tiered distributed security authentication and filtering. For example, an authentication system 100A of a remote device 21 communicates with the subscription system 100S of the server 11 (and database 12) over the network 13 for user authentication, according to embodiments of the invention.

The distributed security system 100 provides the ability to accurately and consistently control access to a plurality of remote machines deployed in the field. This involves propagation of service user credentials to the remote machines, fine grained control over access to remote machine resources, and limiting service action on a remote machine based on personal credentials of each user authenticated to access the remote machine.

Figure 3:
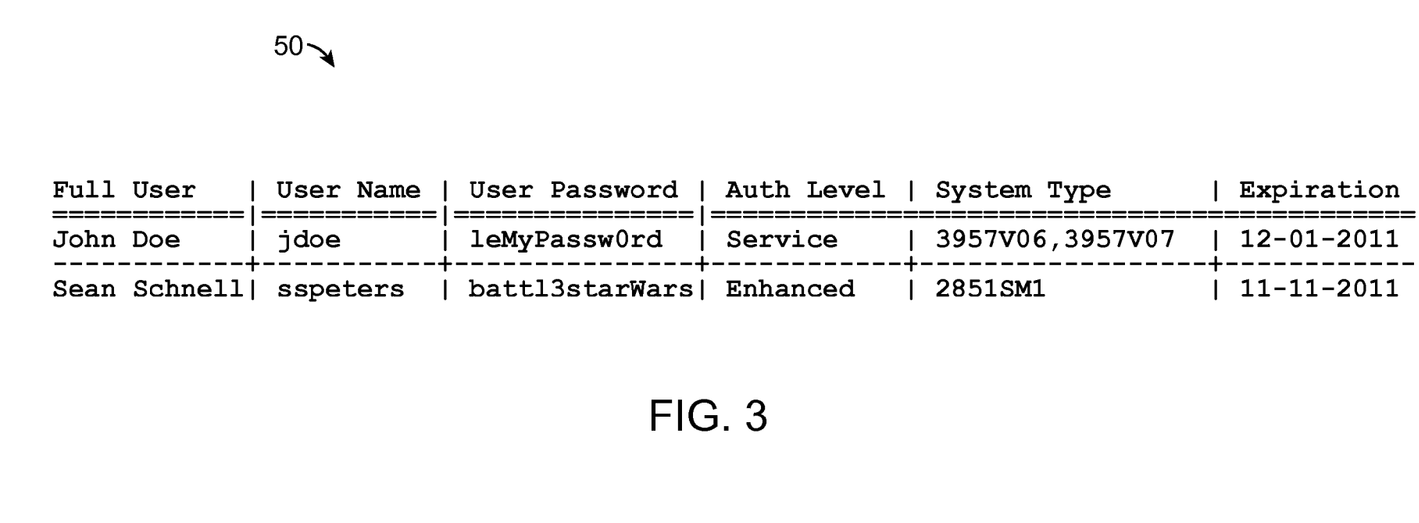
FIG. 3 shows user subscription information for multi-tiered distributed security authentication and filtering, according to an embodiment of the present invention.

Referring to FIG. 3, in one implementation of the invention, the subscription information 50 includes user multilevel authentication information for user authentication, and system authorization information for filtering access to computing resources. In this example, the subscription information 50 comprises a master list that includes user authentication information (e.g., a list of users, usernames, passwords), and system authorization information (e.g., authorized system types per user). The user authentication information allows managing user access via multilevel authentication and multilevel passwords. The system authorization information allows further managing user access via filtering by user and filtering by limiting access to certain systems.

Figure 4:
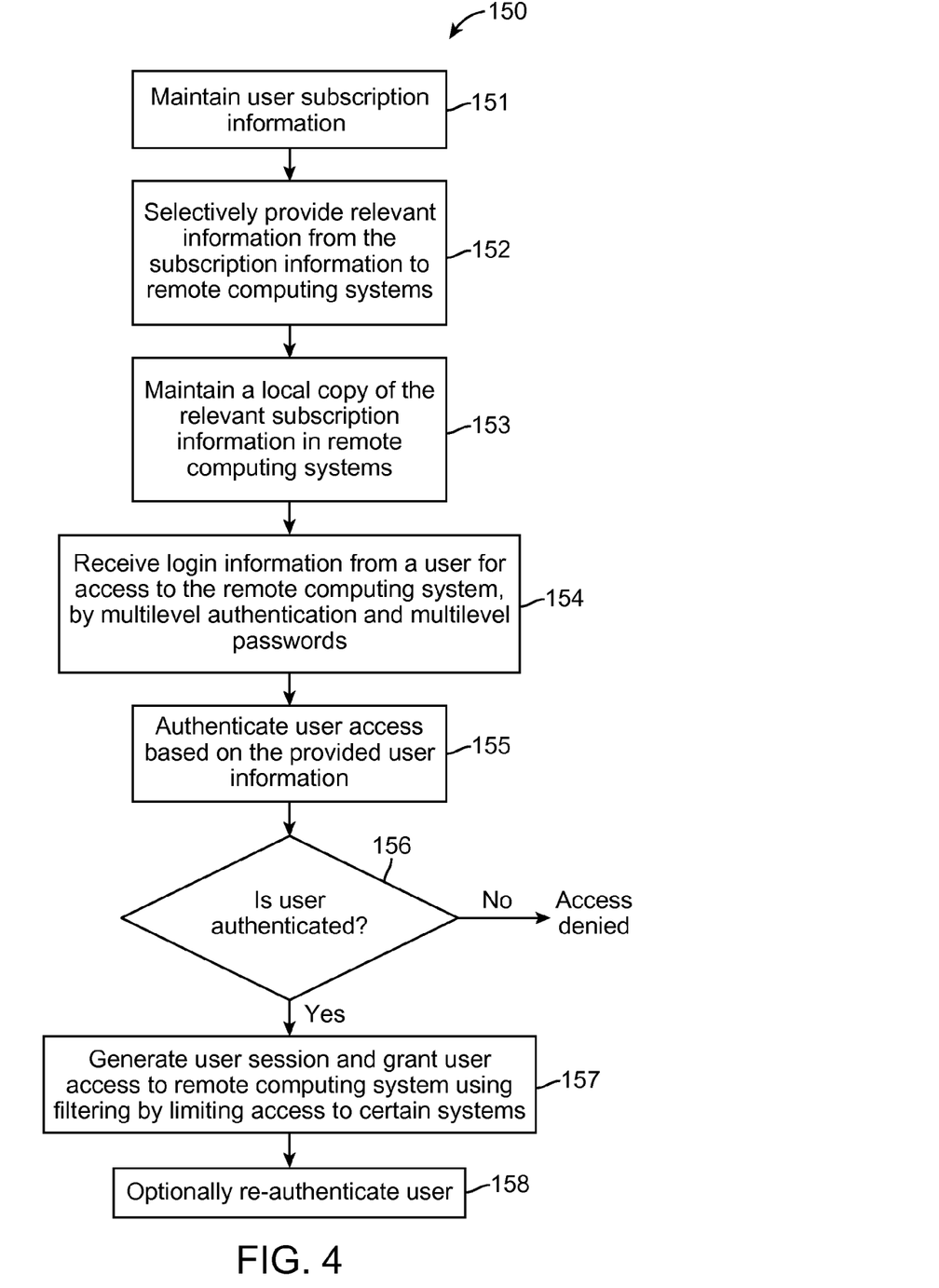
FIG. 4 shows a flowchart illustrating a process for multi-tiered distributed security authentication and filtering, according to an embodiment of the present invention.

FIG. 4 shows a multi-tiered distributed security authentication and filtering process 150 implemented by the distributed security system 100, according to an embodiment of the invention. The process 150 includes multilevel authentication and multilevel passwords, augmented by filtering by user and filtering by limiting access to certain systems.

Process block 151 comprises the subscription system 100S of the server 11 maintaining user subscription information including the master list 50. The user subscription information allows multilevel authentication and multilevel passwords, augmented by filtering by user and filtering by limiting access to certain systems, as described herein. FIG. 3 shows an example of a subset of user records. The passwords listed in the example master list shown in FIG. 3 will expire after a given time period, forcing the users to modify their passwords or lose access to the remote computing systems and associated computing resources.

In one example, Service and Enhanced users also have expiring passwords, requiring such users to confirm the password in the master list before attempting to remotely login to a remote computing system 21. Service and Enhanced user groups represent two different levels of access to the system. Enhanced has more authority on a system than Service. These terms can be replaced by other user groups that describe various levels of access to the systems, according to embodiments of the invention. In one embodiment, the master list includes a historic view of the passwords as well, such that if a remote computing system has a downlevel version of the master list, the user can still recover approved password for that remote computing system.

Process block 152 comprises filtering by selectively providing (e.g., propagating) relevant information from the master list 50 to the authentication systems 100A of the remote computing systems 21 for their consumption. In one example, an authentication system 100A of a remote computing system 21 periodically sends requests to the subscription system 100S of the server 11, for updated subscription information from the master list for relevant users of the remote computing system 21.

In one implementation, according to the process block 152 the authentication system 100A of a remote computing system 21 only downloads relevant subscription information from the master list 50 for users that are associated with the computing resources of that remote computing system 21. As such, if a remote computing system 21 has multiple attached modules/systems as its computing resources, the authentication system 100A will query the master list 50 for subscription information of only the relevant users for the attached systems of the remote computing system 21.

For example, given the master list 50 in FIG. 3, the authentication system 100A of the remote computing system 21 may download a relevant row of the master list 50 containing relevant subscription information for John Doe only. The authentication system 100A does not download subscription information for user Sean Schnell because user Sean Schnell has not been authenticated to access any of the attached systems on the of the remote computing system 21, and therefore will not be given access to the of the remote computing system 21.

Process block 153 comprises the authentication system 100A maintaining a local copy of the relevant subscription information 50C for authenticating user access to the remote computing system 21. In one example, the authentication system 100A maintains in the local copy 50C the date when the relevant subscription information was downloaded from the master list 50. This will ensure a user attempting to access the remote computing system 21 via the authentication system 100A will be able to supply the proper username and password for the list of authorizes users of the remote computing system 21.

Process block 154 comprises the authentication system 100A receiving login information from a user for access to the remote computing system 21, for multilevel authentication and multilevel passwords. In one implementation, when the user John Doe needs to authenticate access to the remote computing system 21, the user logs into a login module 100B of authentication system 100A of the remote computing system 21. The login module 100B requests user authentication information including level (e.g., Service) and password (e.g., #############).

Upon John Doe supplying the correct username and password, the login module 100B requests user John Doe to supply his personal username (e.g., jdoe) and password (e.g., 1eMyPassw0rd). According to embodiments of the invention, there are several levels of password authentication. A personal password is a user-controlled password that will authenticate the user on a system. A system password is a temporary password that is generated randomly to allow temporary passwords to the user to gain access to the system.

Process block 155 comprises authenticating user access based on the login information provided by the user, using multilevel authentication and multilevel passwords. In one implementation, the personal credentials (e.g., username, password) are passed to an authentication module 100C of the authentication system 100A. The authentication module 100C then determines if the user supplied a supported combination of personal credentials, by checking the supplied information against local subscription information 50C (e.g., looking up jdoe|1eMyPassw0rd|#############|Service in the authentication system 100A local cache of the configuration file).

According to process block 156, if the user supplied the correct authentication information such as passwords, then in process block 157 authentication module 100C then grants the authenticated user access to the remote computing system 21, by filtering by user and filtering by limiting access to certain systems. Otherwise, access is denied.

Upon authentication, according to process block 157 the authentication module 100C creates a session based on user name (e.g., jdoe) with the user password, on the remote computing system 21 as well as it computing resources (e.g., attached systems), on which the user is allowed to access. Even though the remote computing system 21 may have multiple attached systems, the authentication system 100A performs further filtering such that the authenticated user is only granted access to those attached systems that the relevant subscription information 50C indicates the user is authorized to access/service.

In one embodiment, according to process block 158 the user may optionally be re-authenticated. In one implementation, once the user session has been created and populated to the attached systems, the authentication system 100A prompts the user to log in one or more times with user name (e.g., jdoe) and password (e.g., 1eMyPassw0rd). When the user session has been created and populated, the user account has been created and is now accessible on the attached systems as well as on the centralized machine that performs the authentication.

In one embodiment, the local session (or account) for an authenticated user on the remote computing system 21 and attached subsystem(s) has a life span of a certain duration (e.g., 24 hours). Therefore, if the authenticated user (e.g., jdoe) needs to access the remote computing system 21 and attached subsystem(s) again after set amount of time, the user will have to re-authenticate, in a similar manner as above.

In one embodiment, if the remote computing system 21 is in a dark site, the authentication system 100A will provide an interface for an operator to configure and save passwords on the remote computing system 21 for support personnel to authenticate with. A dark site is one which does not allow outside communications, or in some cases, does not allow physical access to the system. It is a way of securing the site in a more controlled manner, based on sensitivity of the data on the site.

Embodiments of the invention provide the ability to accurately and consistently control access to the computing systems for field support both locally and remotely. For example, once a user should no longer have access to a computing system, embodiments of the invention provide the ability to quickly and completely remove access by the user to the computing system.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be emphasized that the above-described embodiments of the present invention, particularly, any "preferred" embodiments, are merely possible examples of implementations, merely set forth for a clear understanding of the principles of the invention.

Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A method of managing user access to one or more computing resources, comprising:
    centrally maintaining user subscription information comprising user authentication information and system authorization information based on user credentials, wherein the user subscription information is contained in a master list, wherein the system authorization information includes system type per user;
    providing relevant subscription information from the user subscription information to multiple remote computing systems including propagating user credentials;
    in a remote computing system:
        querying the master list for subscription information for relevant users associated with computing resources of the remote computing system;
        downloading one or more relevant portions of the master list, wherein the relevant portions downloaded comprise the subscription information for the relevant users associated with the computing resources of the remote computing system;
        authenticating a user login to the remote computing system based on user authentication information from the relevant portions downloaded, wherein said user authentication information comprises multilevel authentication and multilevel password information for filtering access to multiple attached systems of the remote computing system and controlling access to the computing resources of the remote computing system based on user credentials of the relevant users associated with the computing resources of the remote computing system, wherein user provided credentials are checked against the multilevel authentication and multilevel password information for authenticating access to the remote computing system, wherein the multilevel authentication and multilevel password information facilitate filtering by user and filtering by limiting access to certain systems, and wherein the multilevel password information comprises personal passwords and system passwords; and
        upon authentication of the user login, selectively authorizing user access to the computing resources of the remote computing system based on system authorization information from the relevant portions downloaded.

2. The method of claim 1, wherein:
    providing relevant subscription information from the user subscription information to multiple remote computing systems further includes, for each remote computing system, selectively propagating from the master list to said remote computing system user credentials for relevant users associated with computing resources of said remote computing system; and
    said system authorization information comprises filtering information for limiting access to certain computing resources of the multiple remote computing systems for each user.

3. The method of claim 1, wherein:
    providing relevant subscription information from the user subscription information to multiple remote computing systems further includes, for each remote computing system, providing said remote computing system with subscription information for relevant users that are associated with computing resources of said remote computing system, wherein one or more rows including said subscription information for said relevant users is downloaded from the master list to said remote computing system.

4. The method of claim 3, wherein:
    selectively authorizing user access to the computing resources of the remote computing system comprises, upon authentication of the user login, limiting access of a user to certain computing resources for the user based on the system authorization information for that user including an assigned level of access.

5. The method of claim 1, wherein:
    a subscription determines which computing resources a user is allowed to access remotely; and
    centrally maintaining user subscription information comprises maintaining and updating the user subscription information in a central computing system in relation to the remote computing systems within a distributed computing system, wherein requests to update subscription information from the master list for relevant users of a particular remote computing system are periodically sent from the particular remote computing system.

6. A system for managing user access to one or more computing resources, comprising:
    a subscription subsystem that centrally maintains user subscription information comprising user authentication information and system authorization information based on user credentials, wherein the user subscription information is contained in a master list, wherein the system authorization information includes system type per user, wherein the subscription subsystem provides relevant subscription information from the user subscription information to multiple remote computing systems including propagating user credentials, wherein said user authentication information comprises multilevel authentication and multilevel password information for filtering access to multiple attached systems of a remote computing system and controlling access to remote computing resources based on user credentials of individual users; and
    for a remote computing system, an authentication subsystem that:
        queries the master list for subscription information for relevant users associated with computing resources of the remote computing system;

downloading one or more relevant portions of the master list, wherein the relevant portions downloaded comprise the subscription information for the relevant users associated with the computing resources of the remote computing system;

authenticates a user login to a remote computing system based on user authentication information from the relevant portions downloaded, and upon authentication of the user login, selectively authorizes user access to the computing resources of the remote computing system based on system authorization information from the relevant portions downloaded, wherein user provided credentials are checked against the multilevel authentication and multilevel password information for authenticating access to the remote computing system, wherein the multilevel authentication and multilevel password information facilitate filtering by user and filtering by limiting access to certain systems, and wherein the multilevel password information comprises personal passwords and system passwords.

7. The system of claim 6, wherein, for each remote computing system, the subscription subsystem provides said remote computing system with subscription information for relevant users associated with computing resources of said remote computing system, wherein one or more rows including said subscription information for said relevant users is downloaded from the master list to said remote computing system.

8. The system of claim 7, wherein:
for each remote computing system, the subscription subsystem selectively propagates from the master list to said remote computing system user credentials for relevant users associated with computing resources of said remote computing system; and
said system authorization information comprises filtering information for limiting access to certain computing resources of the multiple remote computing systems for each user.

9. The system of claim 8, wherein:
the authentication subsystem authenticates a user login to the remote computing system by checking user provided credentials against the multilevel authentication and multilevel password information, for authenticating access to the remote computing system.

10. The system of claim 9, wherein:
the authentication subsystem selectively authorizes user access to the computing resources of the remote computing system upon authentication of, the user login by limiting access of a user to certain computing resources for the user based on the system authorization information for the user including an assigned level of access.

11. The system of claim 10, wherein:
a subscription determines which computing resources a user is allowed to access remotely; and
the subscription system centrally maintains and updates user subscription information by maintaining the user subscription information in a central computing system in relation to the remote computing systems within a distributed computing system, wherein requests to update subscription information from the master list for relevant users of a particular remote computing system are periodically sent from the particular remote computing system.

12. A computer program product for managing user access to one or more computing resources, the computer program product comprising:

a non-transitory computer readable storage medium having computer readable program code embodied therewith, the computer readable program code comprising:
computer readable program code configured to centrally maintain user subscription information comprising user authentication information and system authorization information based on user credentials, wherein the user subscription information is contained in a master list, wherein the system authorization information includes system type per user;
computer readable program code configured to provide relevant subscription information from the user subscription information to multiple remote computing systems including propagating user credentials;
computer readable program code configured to, in a remote computing system:
query the master list for subscription information for relevant users associated with computing resources of the remote computing system;
download one or more relevant portions of the master list, wherein the relevant portions downloaded comprise the subscription information for the relevant users associated with the computing resources of the remote computing system;
authenticate a user login to the remote computing system based on user authentication information from the relevant portions downloaded, wherein said user authentication information comprises multilevel authentication and multilevel password information for filtering access to multiple attached systems of the remote computing system and controlling access to the computing resources of the remote computing system based on user credentials of the relevant users associated with the computing resources of the remote computing system, wherein user provided credentials are checked against the multilevel authentication and multilevel password information for authenticating access to the remote computing system, wherein the multilevel authentication and multilevel password information facilitate filtering by user and filtering by limiting access to certain systems, and wherein the multilevel password information comprises personal passwords and system passwords; and
upon authentication of the user login, selectively authorize user access to the computing resources of the remote computing system based on system authorization information from the relevant portions downloaded.

13. The computer program product of claim 12, wherein, for each remote computing system, said remote computing system is provided with subscription information for one or more users that are associated with computing resources of said remote computing system, wherein one or more rows including said subscription information for said one or more users is downloaded from the master list to said remote computing system.

14. The computer program product of claim 13, wherein:
for each remote computing system, user credentials for relevant users associated with computing resources of said remote computing system is selectively propagated from the master list to said remote computing system; and
said system authorization information comprises filtering information for limiting access to certain computing resources of the multiple remote computing systems for each user.

15. The computer program product of claim 14, further comprising:

computer readable program code configured to authenticate a user login to the remote computing system by checking user provided credentials against the multilevel authentication and multilevel password information, for authenticating access to the remote computing system.

16. The computer program product of claim 15, further comprising:
computer readable program code configured to selectively authorize user access to the computing resources of the remote computing system by, upon authentication of the user the user login, limiting access of a user to certain computing resources for the user based on the system authorization information for the user including an assigned level of access.

17. The computer program product of claim 16, wherein a subscription determines which computing resources a user is allowed to access remotely, and the computer program product further comprises computer readable program code configured to centrally maintain and update user subscription information by maintaining the user subscription information in a central computing system in relation to the remote computing systems within a distributed computing system, wherein requests to update subscription information from the master list for relevant users of a particular remote computing system are periodically sent from the particular remote computing system.

18. A method of managing user access to one or more computing resources, comprising:
centrally maintaining user subscription information comprising user authentication information and system authorization information based on user credentials, wherein the user subscription information is contained in a master list, wherein the system authorization information includes system type per user; and
providing relevant subscription information from the user subscription information to multiple remote computing systems including propagating user credentials;
wherein each remote computing system:
queries the master list for subscription information for relevant users associated with computing resources of said remote computing system;
downloads one or more relevant portions of the master list, wherein the relevant portions downloaded comprise the subscription information for the relevant users associated with the computing resources of said remote computing system;
authenticates a user login to said remote computing system based on user authentication information from the relevant portions downloaded; and
upon authentication of the user login, selectively authorize user access to the computing resources of said remote computing system based on system authorization information from the relevant portions downloaded, wherein said user authentication information comprises multilevel authentication and multilevel password information for filtering access to multiple attached systems of said remote computing system and controlling access to the computing resources of said remote computing system based on user credentials of the relevant users associated with the computing resources of said remote computing system, wherein user provided credentials are checked against the multilevel authentication and multilevel password information for authenticating access to the remote computing system, wherein the multilevel authentication and multilevel password information facilitate filtering by user and filtering by limiting access to certain systems, and wherein the multilevel password information comprises personal passwords and system passwords.

* * * * *